(12) United States Patent
Dunn et al.

(10) Patent No.: US 9,980,086 B2
(45) Date of Patent: *May 22, 2018

(54) SYSTEM AND METHOD FOR PROVIDING EMERGENCY SERVICE IN AN IP-BASED WIRELESS NETWORK

(71) Applicant: T-Mobile USA, Inc., Bellevue, WA (US)

(72) Inventors: Timothy N. Dunn, Issaquah, WA (US); Vishal Narkar, Bellevue, WA (US); Michael Hooker, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/604,614

(22) Filed: May 24, 2017

(65) Prior Publication Data

US 2017/0257737 A1   Sep. 7, 2017

Related U.S. Application Data (63) Continuation of application No. 14/727,743, filed on Jun. 1, 2015, now Pat. No. 9,668,090, which is a (Continued)

(51) Int. Cl.
*H04W 4/02* (2018.01)
*H04M 3/51* (2006.01)
*H04M 7/00* (2006.01)
*H04W 64/00* (2009.01)
*H04W 4/22* (2009.01)
(Continued)

(52) U.S. Cl.
CPC ........... *H04W 4/02* (2013.01); *H04L 65/1006* (2013.01); *H04M 3/5116* (2013.01); *H04M 7/006* (2013.01); *H04W 4/20* (2013.01); *H04W 4/22* (2013.01); *H04W 64/00* (2013.01); *H04M 2207/18* (2013.01); *H04M 2242/30* (2013.01); *H04W 76/007* (2013.01); *H04W 80/10* (2013.01)

(58) Field of Classification Search
CPC ......... H04W 4/02; H04W 64/00; H04W 4/22; H04W 4/20; H04M 3/5116; H04M 7/006; H04L 65/1006
USPC ......................................................... 370/328
See application file for complete search history.

(56) References Cited

U.S. PATENT DOCUMENTS

8,594,015 B2  11/2013  Dunn et al.
9,049,551 B2   6/2015  Dunn et al.
(Continued)

*Primary Examiner* — Sai Ming Chan
(74) *Attorney, Agent, or Firm* — Perkins Coie LLP (57) ABSTRACT

An E-CSCF receives a Session Initiation Protocol ("SIP") invitation message initiating an emergency communication session from a calling device. The E-CSCF generates an information request message based on the received SIP message and sends the information request message to a location server. The location server determines a geographical location of the calling device and uses the geographical location to determine a destination emergency response center, such as a Public Safety Access Point (PSAP). The location server provides location information for the destination PSAP to the E-CSCF. The E-CSCF generates a modified SIP invitation message using the presence information and sends the modified SIP invitation message to an emergency services network where it is routed to the emergency response center.

20 Claims, 5 Drawing Sheets

Related U.S. Application Data continuation of application No. 14/089,693, filed on Nov. 25, 2013, now Pat. No. 9,049,551, which is a continuation of application No. 12/846,707, filed on Jul. 29, 2010, now Pat. No. 8,594,015.

(60) Provisional application No. 61/229,696, filed on Jul. 29, 2009.

(51) Int. Cl.
*H04L 29/06* (2006.01)
*H04W 4/20* (2018.01)
*H04W 76/00* (2018.01)
*H04W 80/10* (2009.01)

(56) References Cited

U.S. PATENT DOCUMENTS

| | | |
|---|---|---|
| 9,668,090 B2 | 5/2017 | Dunn et al. |
| 2007/0060097 A1* | 3/2007 | Edge ................ H04L 29/06027 455/404.1 |
| 2007/0149166 A1 | 6/2007 | Turcotte et al. |
| 2008/0107243 A1* | 5/2008 | Terrill .................... H04W 4/02 379/45 |
| 2008/0268809 A1 | 10/2008 | Busin et al. |

* cited by examiner

SYSTEM AND METHOD FOR PROVIDING EMERGENCY SERVICE IN AN IP-BASED WIRELESS NETWORK

CROSS-REFERENCE TO RELATED APPLICATION(S)

This application is a continuation of U.S. patent application Ser. No. 14/727,743, filed Jun. 1, 2015, which is a continuation of U.S. patent application Ser. No. 14/089,693 filed Nov. 25, 2013, now U.S. Pat. No. 9,049,551, which is a continuation of U.S. patent application Ser. No. 12/846,707, filed on Jul. 29, 2010, now U.S. Pat. No. 8,594,015, entitled "SYSTEM AND METHOD FOR PROVIDING EMERGENCY SERVICE IN AN IP-BASED WIRELESS NETWORK"; which claims the benefit of U.S. Provisional Application No. 61/229,696, entitled "IMS/Next Gen 911 and LBS Design Document," filed on Jul. 29, 2009; both of which are incorporated herein in their entireties.

BACKGROUND

Mobile devices can now connect to a wide variety of networks, including networks that use packet-switched connections for both data and voice. It is well-known that the mobility of these devices poses challenges for services that were previously designed for fixed telephones. For example, before the introduction of mobile devices, emergency service providers could depend on every telephone having a consistent location. When a customer dialed 911, the telephone company could route the call to the nearest emergency call center based on the known, fixed location of the customer's telephone. Similarly, the call center could use the telephone's known location to automatically determine a caller's location for sending emergency services. However, with mobile devices, call centers could no longer depend on the caller having a fixed location.

A second challenge for handling emergency calls from mobile devices is that when a mobile device makes an emergency call, the network cannot easily determine which emergency provider should receive the call. In general, a caller who dials 911 expects to be connected with a call center that is capable of dispatching emergency services to the caller's location. Dispatching was easy in traditional telephone networks, because every telephone was associated with one call center. However, historically, it has been complicated to ensure that calls from mobile devices are also correctly routed. Thus, there is a need for systems that can correctly route emergency calls from mobile devices.

DETAILED DESCRIPTION

A system and method for routing an emergency call or message (e.g., a "911" call) from a mobile device in an IP-based wireless network to an emergency response center is disclosed (hereinafter "the emergency system" or the "system"). A calling device sends a Session Initiation Protocol ("SIP") Invite message to a Proxy Call Session Control Function ("P-CSCF"), which forwards all emergency messages to an Emergency Call Session Control Function ("E-CSCF"). The E-CSCF generates an information request message requesting the geographical location of the calling device and sends the request message to a gateway mobile location center ("GMLC"). After receiving the message, the GMLC uses one or more location techniques to determine the geographical location of the calling device. Based on the determined geographic location of the calling device, the GMLC determines a destination emergency response center (e.g., a Public Safety Access Point ("PSAP"), emergency call center, emergency responder, or other similar site) and sends the location information for the destination emergency response center to the E-CSCF. The E-CSCF uses the information in the response message to generate a modified SIP Invite message directed to the destination emergency response center and sends the modified SIP Invite message to the Emergency Services Network ("ES Network"), which routes the SIP Invite message to the destination emergency response center. Once the destination emergency response center has received the message, it communicates with the calling device to set up the phone call or messaging session.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Illustrative Environments

Figure 1:
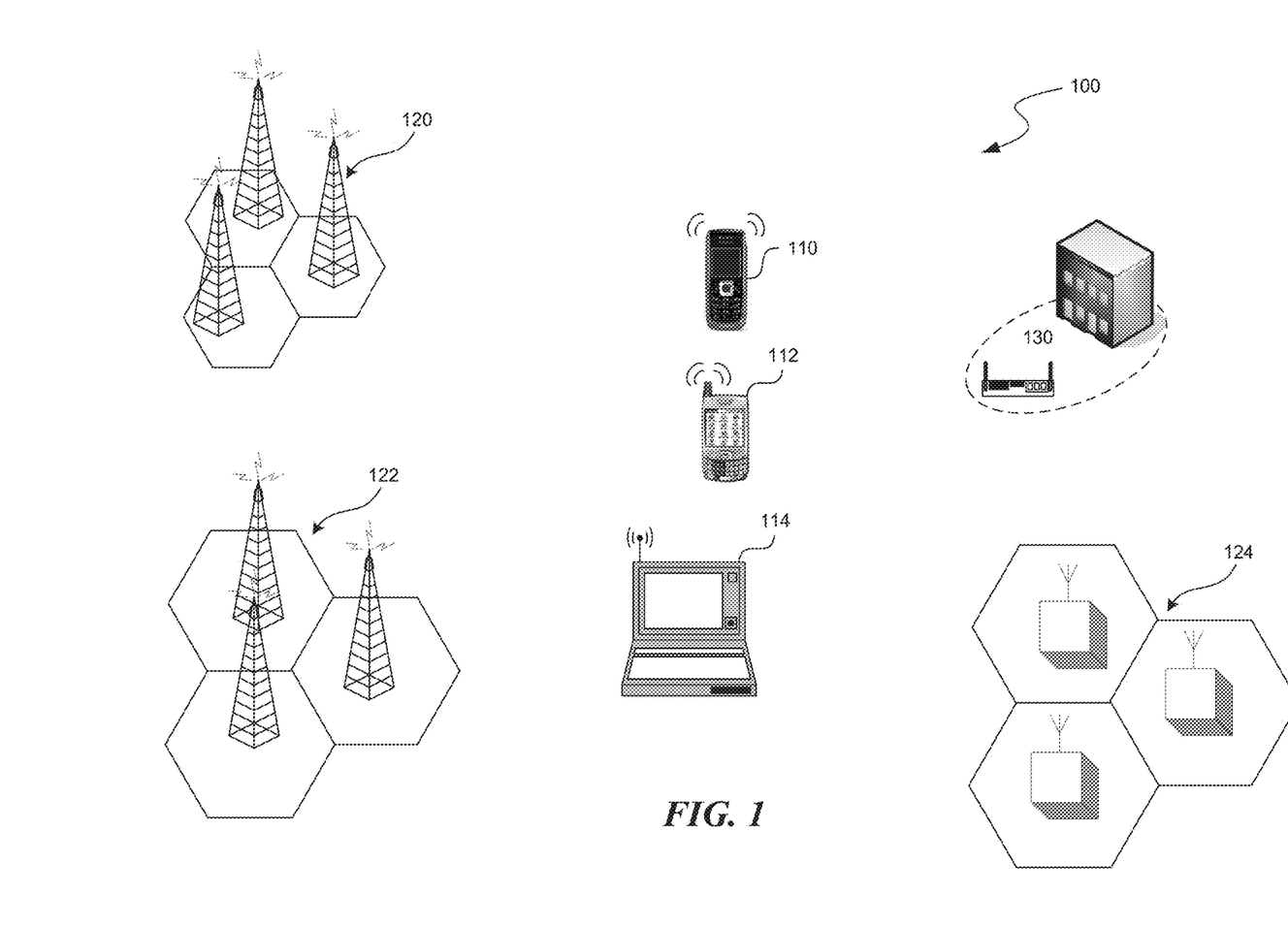
FIG. 1 illustrates a representative environment in which an emergency service (e.g., an E911 service) may operate.

FIG. 1 illustrates a representative environment 100 in which an emergency service (e.g., an E911 service) may operate. The environment 100 includes mobile devices 110, 112, and 114 and wireless networks 120, 122, 124, and 130. Mobile devices 110, 112, and 114 are configured to wirelessly communicate with, or through, one or more of networks 120, 122, 124, and 130. In some embodiments, the networks 120, 122, 124, and/or 130 may provide access points that also support connections from fixed devices, such as fixed telephones. For example, an access point may include a connector for accepting a standard RJ-11 plug from a fixed telephone.

Mobile devices 110, 112, and 114 may include virtually any devices for communicating over a wireless network. For example, the mobile devices 110, 112, and 114 may include mobile handsets capable of communicating using various wireless standards, such as Global System for Mobile Communications ("GSM"), Time Division Multiple Access ("TDMA"), Universal Mobile Telecommunications System ("UMTS"), Evolution-Data Optimized ("EVDO"), Long Term Evolution ("LTE"), Generic Access Network ("GAN"), and Unlicensed Mobile Access ("UMA"). The mobile devices 110, 112, and 114 may also include other mobile computers or devices, such as Voice over Internet Protocol ("VoIP") devices, Secure User Plane Location ("SUPL") Enabled Terminals ("SETs"), Personal Digital Assistants ("PDAs"), radio frequency devices, infrared devices, handheld computers, laptop computers, wearable computers, tablet computers, pagers, integrated devices combining one or more of the preceding devices, and/or the like. As such, mobile devices 110, 112, and 114 may range widely in terms of capabilities and features.

Users may employ mobile devices 110, 112, and 114 to communicate with other users or devices. In addition, users may employ mobile devices 110, 112, and 114 to receive, provide, or otherwise interact with location-based services such as emergency services (e.g., E911), asset tracking or recovery services, location-based alerts or advertising services, social networking services such as identification of nearby friends and family, and the like.

Mobile devices 110, 112, and 114 typically include a processing unit, volatile memory and/or nonvolatile memory, a power supply, one or more network interfaces, an audio interface, a display, a keypad or keyboard, a GPS receiver and/or other location determination component, and other input and output interfaces. The various components of mobile devices 110, 112, and 114 may be interconnected via a bus. The volatile and nonvolatile memories generally include storage media for storing information such as processor-readable instructions, data structures, program modules, or other data. In particular, the memories may also store applications for performing location determination techniques.

Networks 120, 122, 124, and 130 may include virtually any radio access networks (or "access networks") for facilitating communications to or from mobile devices 110, 112, and 114 using any wireless protocol or standard. These protocols or standards include GSM, TDMA, UMTS, EVDO, LTE, GAN, UMA, Code Division Multiple Access ("CDMA"), Orthogonal Frequency Division Multiple Access ("OFDM"), General Packet Radio Service ("GPRS"), Enhanced Data GSM Environment ("EDGE"), Advanced Mobile Phone System ("AMPS"), WiMAX, Wireless Fidelity ("WiFi"), Ultra Mobile Broadband ("UMB"), VoIP, SUPL, IP Multimedia Subsystem ("IMS"), and the like. Networks 120, 122, 124, and 130 may be operated by a mobile telephony service provider, an Internet service provider, businesses, individuals, or other network operators.

In FIG. 1, networks 120, 122, and 124 are illustrated as macronetworks, i.e., networks designed to cover relatively large areas such as cities, metropolitan areas, regional areas, multistate areas, and the like. Protocols and standards such as GSM, TDMA, UMTS, EVDO, LTE, CDMA, OFDM, GPRS, EDGE, AMPS, WiMAX, UMB, and the like are generally employed with macronetworks. Network 130 is illustrated as a micronetwork, i.e., a network designed to cover a smaller area such as a neighborhood, park, city, building, home, and the like. As an example, protocols and standards such as WiFi, GAN, UMA, Wireless Universal Serial Bus (WUSB), ZigBee, and the like are generally employed with micronetworks. However, in certain circumstances (e.g., in conjunction with picocell broadcast architecture), micronetworks may also employ protocols or standards more traditionally associated with macronetworks.

Illustrative Communications System

Figure 2:
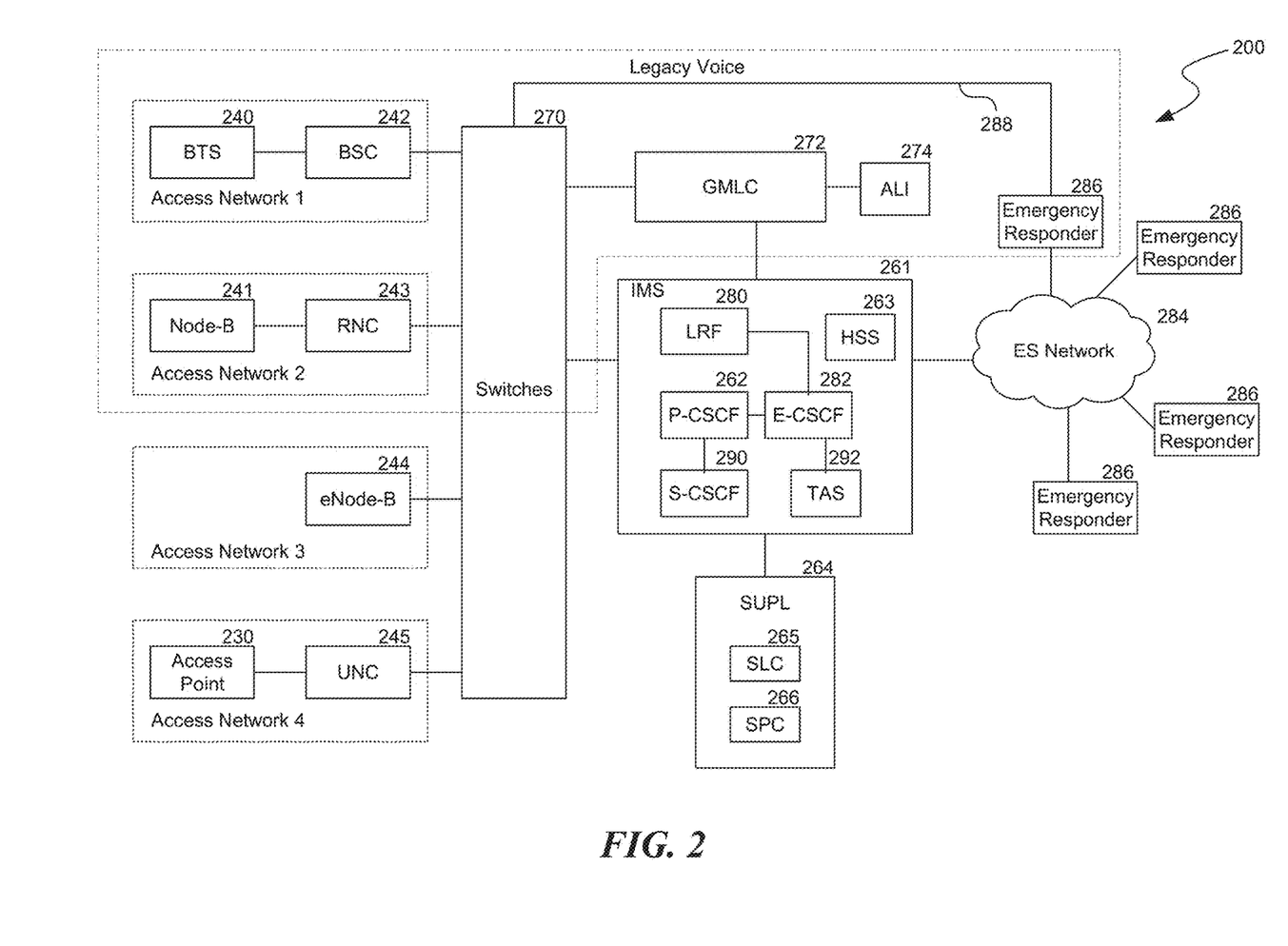
FIG. 2 illustrates a communications system that includes an integrated emergency system.

FIG. 2 illustrates a communications system 200 having an integrated emergency system. Communications system 200 shows four access networks that are coupled to supporting network infrastructure via one or more switches 270. While four access networks are shown in FIG. 2, it will be appreciated that the communications system 200 may include a greater or lesser number of access networks. Moreover, while switches 270 are depicted as a contiguous block, it will be appreciated that such a block merely represents switching functionality that is distributed across numerous independent or dependent switches. The communications system 200 depicted in FIG. 2 is operated by a telecommunications service provider, and may be coupled (not shown) with other communications systems operated by the same or other telecommunications service providers.

Access network 1 is a GSM access network that includes one or more Base Transceiver Stations ("BTSs") 240 and one or more Base Station Controllers ("BSC") 242. BSC 242 is coupled between switches 270 and BTS 240 to provide a voice interface to, and control certain operational aspects of, BTS 240. For example, BSC 242 may be configured to control handoffs, network registration for mobile devices, channel allocation, radio transmitter output power, and/or the like. Access network 1 takes positioning measurements or provides location estimates by using techniques that are compatible with the applicable network radio protocols. For example, access network 1 may provide positioning measurements or location estimates using U-TDOA, CI-TA, E-CGI, GPS, AGPS, E-OTD techniques, or hybrid methods that employ combinations of these techniques.

Access network 2 is a UMTS access network that includes one or more Node-Bs 241 and one or more Radio Network Controllers ("RNCs") 243. RNC 243 is coupled between switches 270 and Node-B 241 to provide a data interface to, and control certain operational aspects of, Node-B 241. Access network 2 takes positioning measurements or provides location estimates using techniques that are compatible with UMTS protocols. For example, access network 2 may provide positioning measurements or location estimates using CI, CI-RTT, GPS, AGPS, OTDOA techniques, or hybrid methods that employ combinations of these techniques.

Access network 3 is an LTE access network that includes one or more instances of eNode-Bs 244. One instance of eNode-B 244 is coupled to switches 270 to interface mobile devices directly to switches 270. In some configurations, the eNode-B 244 is employed as a consolidated LTE counterpart of BTS 240, Node-B 241, BSC 242, and RNC 243. Access network 3 takes positioning measurements or provides location estimates using techniques that are compatible with LTE protocols. For example, access network 3 may provide positioning measurements or location estimates using AGPS, downlink positioning, enhanced CI techniques, and/or hybrid methods that employ combinations of these techniques. The positioning measurements and location determinations within access network 3 are effectuated using either control plane methods or user plane methods.

BTS 240, Node-B 241, eNode-Bs 244, or other components or devices positioned at distributed locations to provide wireless network coverage throughout a geographical area may be referred to as a cell site. In certain instances, cell sites may also include other components such as BSCs, RNCs, SMLC/SASs, switches, MMEs, and/or the like. Access network 4 is a GAN access network that includes one or more access points 230 and one or more Unlicensed Network Controllers ("UNCs") 245. An access point 230 may also serve to route communications between mobile devices and other network components (e.g., UNC 245) over an IP-based network. An access point typically provides coverage for a relatively small area, such as for a femtocell within a building (e.g., home, office, shopping mall, train station, or the like) or within an aircraft, ship, train, or other vehicle. Access point 230 may take the form of a WiFi access point, a HotSpot component, a wireless router, a wireless access point, and the like. One or more access points may be coupled to UNC 245 or another network component to interface the access points to switches 270. For example, UNC 245 may be a UMA/GAN counterpart of RNC 243. In addition, a Generic Access Network Controller (GANC) may be used as UNC 245. Access network 4 may also take positioning measurements or provide location estimates by utilizing techniques that are compatible with GAN protocols. For example, the access network 4 may provide location estimates using identifiers such as MAC addresses, International Mobile Subscriber Identifiers ("IMSI"), IP addresses, CGI, or hybrid methods that employ combinations of these identifiers.

Each access network is connected to a GMLC 272 by one or more switches 270. Switches 270 are configured to provide voice and data interfaces, as appropriate, to BSC 242, RNC 243, eNode-B 244, and UNC 245. Switches 270 may be configured to switch voice traffic from one or more base station controllers to a Public Switched Telephone Network (PTSN) or to a telephone switch such as a 5ESS switch, a PBX switch, and/or the like. Likewise, switches 270 may be further configured to switch data from one or more RNCs to a data network, a router, another switch, and the like. Also, switches 270 may include a Mobile Switching Center (MSC), a media gateway, a call gateway, and the like.

In control plane-based location determinations, the GMLC 272 requests routing information (e.g., from a Home Subscriber Server ("HSS") 263), sends positioning requests to switches 270, and receives location estimates from one or more access networks. The GMLC may additionally perform administrative functions such as authentication/security, privacy and billing. The GMLC is coupled to an Automatic Location Identification Database ("ALI database") server 274, which maps phone numbers to physical addresses or geographical locations. The ALI database generally has a companion Master Street Address Guide (MSAG) database that describes address elements, including the exact spellings of street names, and street number ranges.

Collectively, access networks 1 and 2 represent older network architectures ("legacy" networks) that enable a communication session to be established between mobile devices and other mobile or fixed devices. When a user of a mobile device attempts to establish an emergency call, the communication is routed to the emergency response center 286, such as a Public Safety Access Point (PSAP), that can dispatch emergency services to the user's location. Such a routing is reflected by a path 288 in FIG. 2.

The communication system 200 also includes an IP Multimedia System (IMS) 261, which interacts with other network components to provide IP services to a mobile device. As illustrated, IMS 261 includes a P-CSCF 262, an E-CSCF 282, a Serving Call Session Control function ("S-CSCF") 290, a Location Retrieval Function ("LRF") 280, and a Home Subscriber Server ("HSS") 263. IMS 261, P-CSCF 262, E-CSCF 282, S-CSCF 290, LRF 280 and HSS 263 may respectively be an IMS, a P-CSCF, an E-CSCF, a S-CSCF, an LRF, and an HSS as described by the IMS specifications and technical reports of the 3GPP, Telecoms and Internet Converged Services and Protocols for Advanced Networks ("TISPAN"), or other standards organizations. In particular, in some implementations, IMS 261, P-CSCF 262, E-CSCF 282, S-CSCF 290, LRF 280 and HSS 263 may respectively be an IMS, a P-CSCF, an E-CSCF, a S-CSCF, an LRF and an HSS as described by technical reports TR 23.826, TR 23.870, and/or TR 23.167, all developed by the 3GPP.

The IMS 261 is coupled to a Secure User Plane for Location (SUPL) system 264, which is configured to facilitate user-plane implementations of location-based services and location estimations. In user-plane implementations, a mobile device typically invokes a location-based service directly via TCP/IP protocols without utilizing a signaling system 7 ("SS7") signaling protocol and/or without routing a service request through switches 270. The IMS 261 also incorporates a Telephony Application Server (TAS) 292, which facilitates the execution of various UMA-positioning techniques to determine the location of a mobile device. As illustrated, SUPL system 264 includes SUPL Location Center ("SLC") 265 and SUPL Positioning Center ("SPC") 266. Each of SUPL system 264, SLC 265, and SPC 266 may be as described by the SUPL standards available from the Open Mobile Alliance (OMA).

The communication system 200 is coupled to an ES network 284, which is configured to connect the IMS network 261 to a group of emergency response centers 286, such as PSAPs, emergency call centers, emergency responders, or other similar sites. Each emergency response center 286 represents a call center or central location for handling emergency phone calls or messaging sessions for a particular geographical area. The ES network 284 is an IP-based network that is used to complete calls or messaging sessions from mobile devices to destination emergency response centers 286. Some emergency response centers 286 in the ES network are emergency response centers that are configured to connect with mobile devices via legacy network connections (such as path 288) in addition to connecting with devices via the IP-based network. Other emergency response centers 286 in the ES network are only capable of communicating with mobile devices through the IP-based network.

In operation, a calling device (e.g., the mobile devices 110, 112, or 114) initiates a call (e.g., voice, video) or other messaging session (e.g., instant messaging) through the IMS network 261 using the Session Initiation Protocol ("SIP") as described in RFC 3261, which is maintained by the Internet Engineering Task Force and is hereby incorporated by reference. To initiate a call or messaging session, the calling device sends a SIP Invite message to the P-CSCF 262 in the IMS network 261. The SIP Invite message is then forwarded to its intended destination or to an intermediate server closer to the intended destination.

Figure 5:
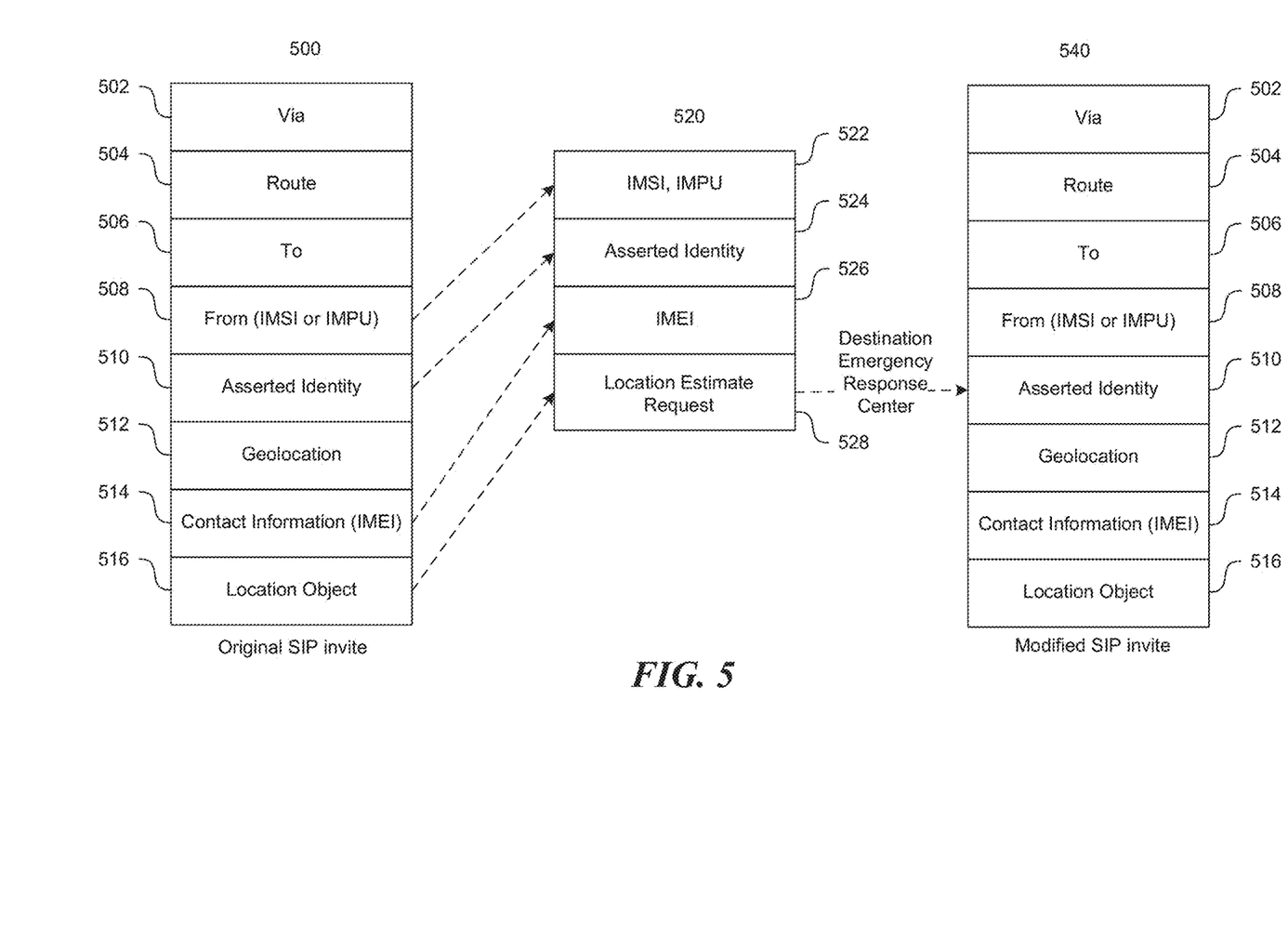
FIG. 5 shows an example of a mapping between a SIP Invite message, an information request message, and a modified SIP Invite message.

FIG. 5 shows an example set of fields for a SIP Invite message 500. The "To" field 506 and the "From" field 508 specify the original source and intended destination, respectively, of the SIP Invite message. For emergency requests, the SIP invite may be formatted in accordance with RFC 5031, entitled "A Uniform Resource Name (URN) for Emergency and Other Well-Known Services," which is incorporated herein by this reference in its entirety. RFC 5031 specifies that the To field takes the form: URN: SERVICE:SOS. In addition, a particular service may be specified such as URN:SERVICE:SOS:POLICE. The "Via" field 502 and the "Route" field 504 specify the sender and intended recipient, respectively, of the current leg of the path between the source and destination. The "Asserted Identity" field 510 provides customized information identifying the sender's identity and may include a name and/or a telephone number for the sender. Moreover, in certain instances the Asserted Identity field 510 may include a pseudo-ANI (Automatic Numbering Information), such as an emergency services routing key (ESRK) or emergency services query key (ESQK) that is generated to identify the mobile subscriber during an emergency services call. The sender's identity is generally separate from the "From" field 508, which provides network information for the calling device. In addition to the standard information included in SIP Invite messages, a network provider may specify additional data that is appended to existing fields. For example, the provider may specify that the calling device's International Mobile Equipment Identifier ("IMEI"), the user's International Mobile Subscriber Identifiers ("IMSI"), the user's IP Multimedia Public Identity (IMPU), or similar identifier are included as part of the From field 508 or a Contact Information field 514. The SIP Invite message may also include a Geolocation field 512 and a Presence Information field 516, which are used to provide initial location information (e.g., a location object) for the calling device.

Once the SIP Invite message has been forwarded to its intended destination, the recipient may send a response message through the same intermediate servers to accept or reject the call or messaging session. The parties may also exchange additional messages to define the parameters of the call or messaging session. The parties use the information to set up a connection that may or may not pass through the intermediate servers. When the call or messaging session is complete, one of the parties sends a SIP message to terminate the session.

A problem arises when the IMS system is used to make emergency calls or establish emergency messaging sessions. In general, emergency calls are made to a standard telephone number (e.g., 911), regardless of where the calling device is located. Users expect that calls will be directly routed to an emergency response center, such as a PSAP, that can dispatch emergency services to the user's location. Users would not expect their communications to be routed to a different emergency response center that covers a different geographical area. Because the calling device does not know the correct emergency response center to call, the network must enable a connection with the appropriate emergency response center. As discussed herein, the emergency system solves this by intercepting SIP Invite messages at the E-CSCF 282. The E-CSCF 282 then requests the GMLC 272 to determine the destination emergency response center (e.g., PSAP) based on the calling device's geographical location. The GMLC 272 provides the destination emergency response center's location information to the E-CSCF 282, which forwards a modified SIP Invite message to the ES Network 284.

Figure 3:
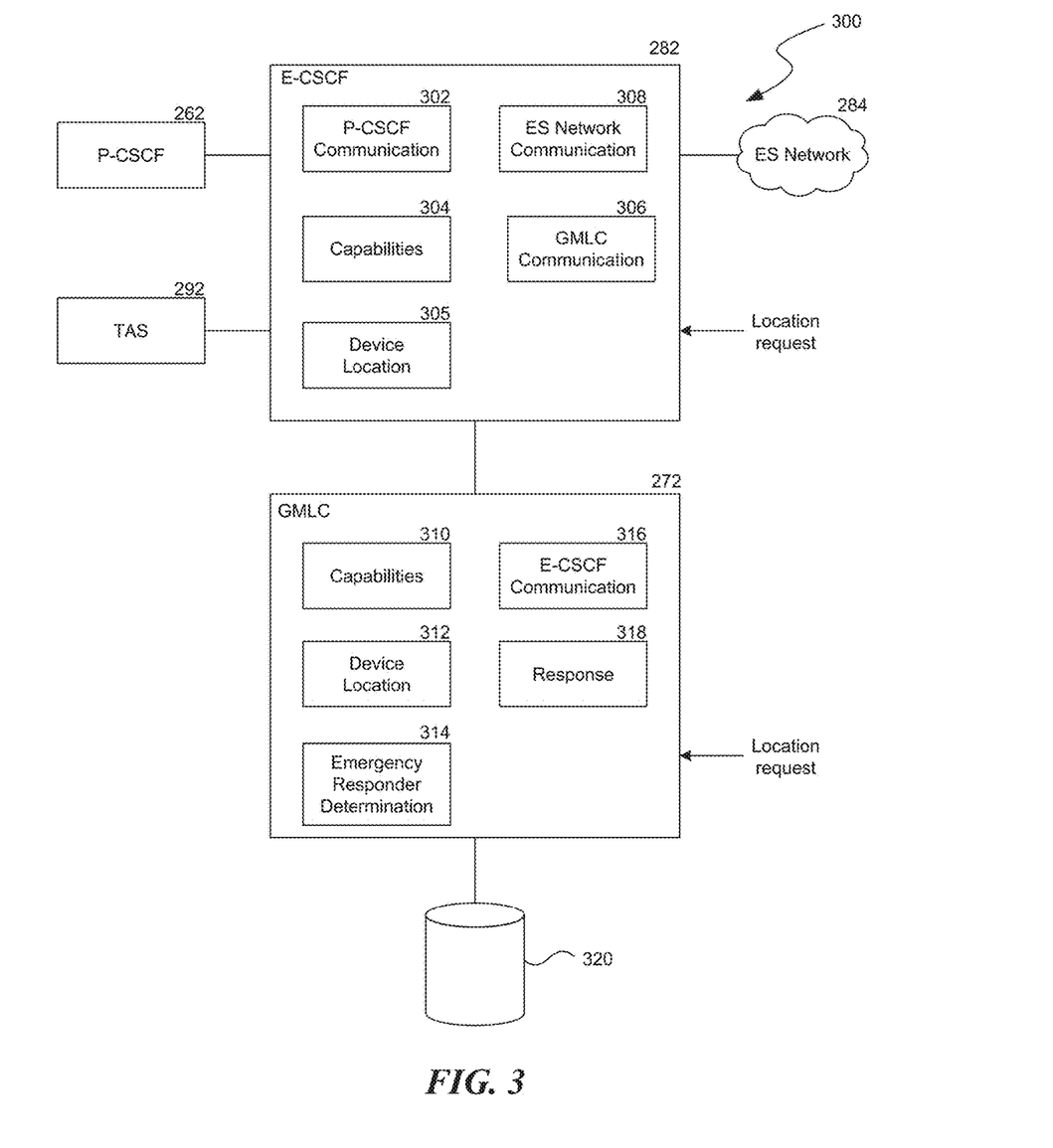
FIG. 3 is a logical block diagram of a subsystem for directing Session Initiation Protocol ("SIP") Invite messages to a destination response center in an emergency system.

FIG. 3 is a logical block diagram of a subsystem 300 for directing SIP Invite messages to a destination emergency response center. As shown in FIG. 3, the subsystem 300 includes the E-CSCF 282 and the GMLC 272. The E-CSCF 282 includes a P-CSCF communication component 302, which is configured to exchange messages with the P-CSCF 262. During operation, the P-CSCF 262 receives all SIP Invite messages and directs messages initiating emergency communications to the E-CSCF 282. All other messages are directed to the S-CSCF 290.

In some circumstances, the E-CSCF 282 is able to determine the location of the requesting mobile device using location determination techniques that are available to it, or based on information that it receives from the requesting mobile device. For example, a requesting mobile device may determine its locations via GPS (or other available location determination method) and transmit its location in the SIP Invite message. The location determination methods associated with a particular mobile device are stored in a capability determination component 304, which uses device information and subscriber information in the information request message to determine which location techniques are supported by the calling or messaging device. The capability determination component 304 may do so using a capabilities database, which stores information about the particular capabilities of devices that are registered to use the IMS network 261. The E-CSCF 282 contains a device location component 305 which is configured to initiate certain location techniques to find a geographical location for the calling device. Such location techniques include those techniques that are available via TAS 292.

In circumstances in which the E-CSCF 282 is unable to determine the location of the mobile device using techniques available to it, or if the mobile device is unable to provide its location, the E-CSCF relies on the GMLC 272 to determine the location of the device. To do so, the E-CSCF 282 also includes a GMLC communication component 306, which communicates with the GMLC 272. In particular, the GMLC communication component 306 generates an information request message based on the received SIP Invite message. The GMLC communication component 306 then forwards the information request message to the GMLC 272. Once the GMLC 272 has finished its processing, the GMLC communication component 306 also receives a response message from the GMLC 272. The E-CSCF 282 also includes an ES network communication component 308, which generates a modified SIP Invite message based on the response message and forwards the modified SIP Invite message to the ES network 280 for routing to the destination emergency response center.

The subsystem 300 also includes the GMLC 272, which determines the geographical location of the calling device and determines an emergency response center based on the determined geographical location. In particular, the GMLC 272 also includes a capability determination component 310, which uses device information and subscriber information in the information request message to determine which location techniques are supported by the calling device. The capability determination component 310 may do so using a capabilities database, which stores information about the particular capabilities of devices that are registered to use the IMS network 261. For instance, the capabilities database may store information specifying whether individual devices include a built-in GPS component that can be used for location determination. The capabilities database may be stored in a storage component 320 that is connected to the GMLC 272.

The GMLC 272 also includes a device location component 312, which is configured to use various location techniques to find a geographical location for the calling device. Methods for determining a geographical location for a mobile device are discussed in greater detail in U.S. patent application Ser. No. 12/769,524, filed Apr. 28, 2010, and entitled "Location Continuity Service for Locating Mobile Devices Using Multiple Access Networks Including Wireless Telecommunication Networks," which is hereby incorporated by reference in its entirety. The particular method or methods used by the device location component 312 may be selected from the set of techniques determined by the capability determination component 310.

Once the GMLC 272 has determined a geographical location for the calling device, an emergency response center determination component 314 uses the information to select the destination emergency response center. In general, each emergency response center handles calls or messaging sessions for a pre-determined geographical area. Thus, the emergency response center determination component 314 selects the destination by finding the response center (e.g. PSAP) that covers a geographical area that includes the calling device's current geographical location. The geographical area information covered by each emergency response center may be stored in an emergency response center database in the storage component 320. The emergency response center database also stores location information for each response center, including a network address for the response center and potentially also including geographical location information for the response center (i.e., information that specifies the precise location of the emergency response center).

The GMLC 272 also includes a response component 318, which generates a response message specifying the destination emergency response center and providing some or all of the stored location information for the response center. An E-CSCF communication component 316 then forwards the response message to the E-CSCF 282. In some embodiments, the response message is a modified SIP Invite message that is generated based on the original SIP Invite message. The E-CSCF 282 can then forward the modified SIP Invite message to the destination without performing any additional processing. In other embodiments, the response message contains only the location information. In these embodiments, the E-CSCF 282 generates the modified SIP Invite message using the received SIP Invite message and the response message.

Figure 4:
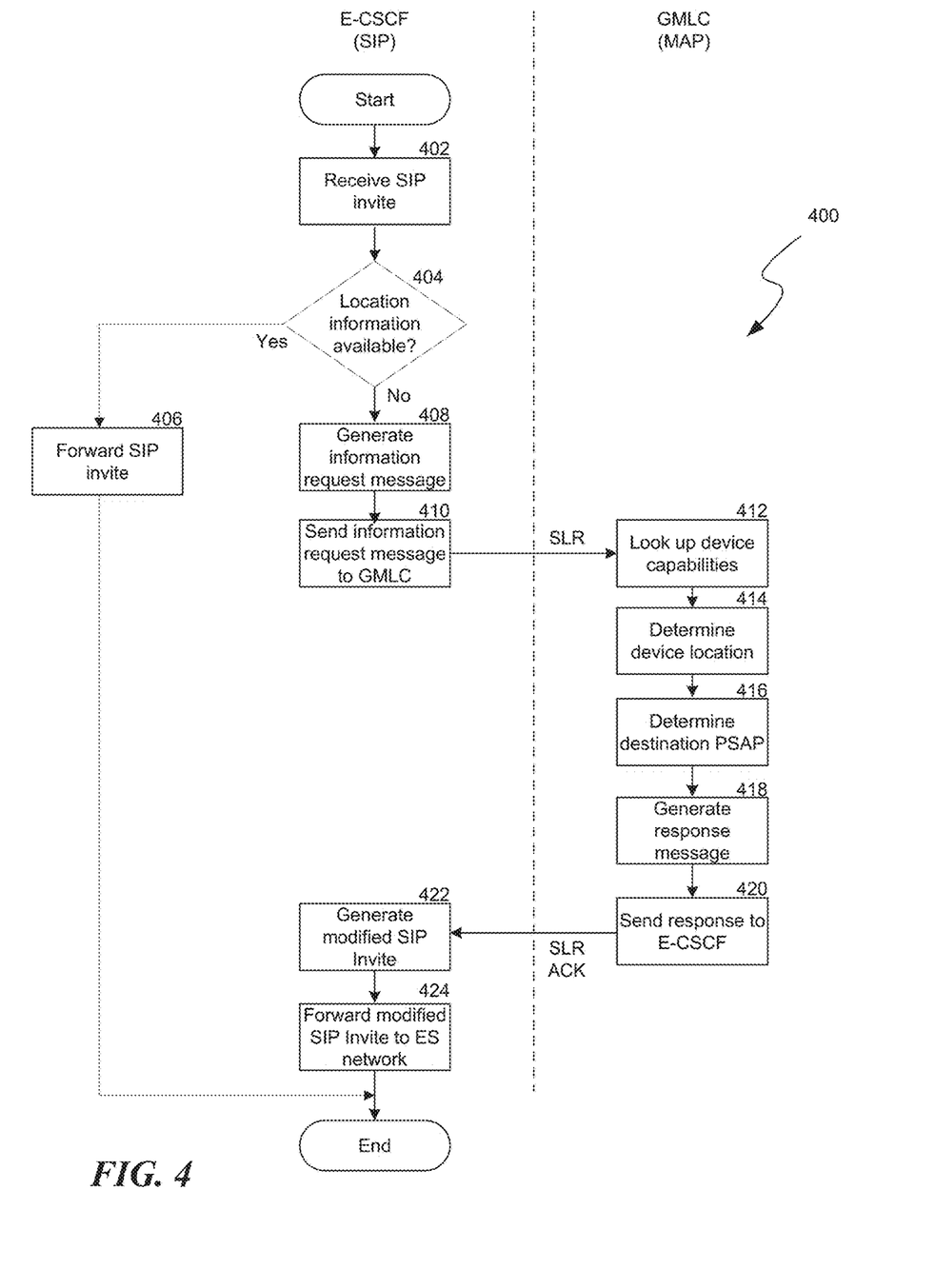
FIG. 4 is a flow chart of a process for directing a SIP Invite message to a destination response center via an emergency system.

FIG. 4 is a flow chart of a process 400 for directing a SIP Invite message to a destination emergency response center via an emergency system. Processing begins at block 402, where the E-CSCF 282 receives a SIP Invite message from the P-CSCF 262. As discussed above, the P-CSCF 262 routes SIP Invite messages for emergency calls to the E-CSCF 282 and all other SIP Invite messages to the S-CSCF 290. After receiving the message, the system proceeds to decision block 404, where it determines if the E-CSCF is able to identify the location of the mobile device using location information available to it or information provided by the mobile device in the SIP Invite message. That is, the E-CSCF determines if the location of the mobile device is available either from the device location component 305, the TAS 292, or information contained in the SIP Invite message. If the location of the mobile device is available or has been provided to the E-CSCF, processing proceeds to block 406, where the E-CSCF 282 forwards the SIP Invite message to the appropriate emergency responder 286 in the ES network 284 based on the location of the mobile device. The ES network 284 then forwards the SIP Invite message to the destination emergency response center.

However, if the E-CSCF is unable to determine the location of the mobile device, processing proceeds to block 408. At block 408, the E-CSCF 282 generates an information request message based on the SIP Invite message. FIG. 5 shows an example set of fields for an information request message 520 and an example mapping of information from the SIP Invite message 500 to the information request message 520 and to the modified SIP Invite message 540. The information request message 520 includes an IMSI or IMPU field 522, which is populated with the IMSI or IMPU that is contained in the From field 508 of the SIP Invite message 500. The information request message 520 also includes an Asserted Identity field 524, which is populated with the name, full telephone number (e.g., an MSISDN), and/or a p-ANI of the calling device that is contained in the Asserted Identity field 510. The IMEI field 526 is populated with the IMEI of the device from the Contact Information field 514 and the Location Estimate field 528 is populated with location information (if any) that is contained in the Presence Information field 516.

Returning to FIG. 4, in block 410 the E-CSCF 282 sends the information request message to the GMLC 272. After receiving the information request message, the GMLC 272 begins processing in block 412, where it looks up the capabilities of the calling device to determine location techniques that may be used to locate the device. To do so, the GMLC 272 may use the IMEI, telephone number, or like information as an index into a capabilities database to determine the capabilities of the calling device. The GMLC 272 then proceeds to block 414, where it determines the calling device's geographical location. The GMLC may initiate any of the location determination techniques that are supported by the calling device to locate the calling device. Alternatively, the GMLC 272 may be configured to automatically initiate one or more location determination techniques, regardless of the capabilities of the calling device. The automatic initiation of a location determination technique may be done, for example, if capabilities information is not available for the calling device. If the calling device is a fixed device, the GMLC 272 may determine the device's geographical location by looking up the location in a subscriber database.

Once the GMLC determines or receives the geographical location of the calling device, processing proceeds to block 416, where the GMLC 272 determines a destination emergency response center based on the current geographical location of the calling device. In general, every emergency response center has a specified coverage area. In block 416, the GMLC 272 determines which emergency response center has a coverage area that includes the geographical location of the calling device. Once the GMLC 272 has determined the destination emergency response center, processing proceeds to block 418, where the GMLC 272 generates a response message based on the destination emergency response center's location information. The location information includes a network address, such as a Uniform Resource Identifier (URI), for the emergency response center and may also include geographical location information. Processing then proceeds to block 420, where the GMLC 272 sends the response message to the E-CSCF 282.

At block 422, the E-CSCF 282 receives the response message and uses the information in the message to generate a modified SIP Invite message 540 (FIG. 5). The modified SIP Invite message may be generated by modifying or replacing information in the original SIP Invite message, such as by appending the destination emergency response center's URI to the Asserted Identity field 510 and/or to any other field in the modified message. Processing then proceeds to block 424, where the E-CSCF 282 forwards the modified SIP Invite message 540 to the ES network 286. After the SIP Invite message has been forwarded to the ES network 286, the process 400 ends.

One skilled in the art will appreciate that the system could be modified in various ways. For example, the E-CSCF 282 could be configured to forward the original SIP Invite message to the GMLC 272, rather than generating an information request message. The GMLC 272 could then directly modify the SIP Invite message to include the destination emergency response center's information. In this implementation, the E-CSCF 282 would then forward the modified SIP Invite message to the ES Network 284 without modifying the message's contents.

As another example, as depicted in FIG. 3, requests for location information about a mobile device are not exclusively generated as a result of a SIP invite from the mobile device. Location requests may come from an emergency responder, from third-party services, or from other parties to either the E-CSCF 282 or the GMLC 272. When such out-of-band requests for location information are received, the E-CSCF or GMLC processes such requests in a similar fashion to that disclosed herein. That is, the E-CSCF or GMLC initiates one or more location determination methods to identify the location of the identified mobile device and respond to the out-of-band location request.

In some embodiments, the network 200 is capable of supporting emergency calls or messaging sessions from devices that are not otherwise subscribers to the network. This may include, for example, mobile devices or other devices that do not have a subscriber information module ("SIM") included. In general, these devices are not capable of making standard calls or otherwise using the network, but they are often permitted to make emergency calls. Thus, the system may be configured to operate using only equipment-related information (e.g., the NEI), rather than using any subscriber information (e.g., the IMSI). In cases where only equipment-related information is received, the system will generally not have any information about the capabilities of the mobile device. Thus, the system may simply attempt all possible location techniques to determine the geographical location of the mobile device.

In addition, the system may allow the destination emergency response center to register to receive updates on the geographical location of the calling device after the call or messaging session has been initiated. Allowing updates may be useful in situations where the call is initiated from a mobile device that continues moving after the emergency communication session is first set up. The emergency response center may want to use the updated geographical location to determine where to dispatch emergency services during or after the emergency communication session. Thus, after the communication session has been set up, the emergency response center 286 may send a request message to the E-CSCF 282 or the GMLC 272 to request location updates as the communication session proceeds. The GMLC 272 may then use the same location techniques to periodically update the geographical location of the calling device. If the location changes, the GMLC 272 can then send a location update message to the PSAP 286.

From the foregoing, it will be appreciated that specific embodiments of the invention have been described herein for purposes of illustration, but that various modifications may be made without deviating from the spirit and scope of the invention. For example, those skilled in the art will appreciate that the depicted flow charts may be altered in a variety of ways. The order of the steps may be rearranged, steps may be performed in parallel, steps may be omitted, or other steps may be included. Accordingly, the invention is not limited except as by the appended claims.

We claim:

1. A system for providing emergency communication services in a wireless network implementing an IP Multimedia Subsystem (IMS) architecture, the system comprising:
   one or more processors; and
   a non-transitory computer-readable medium having instructions stored thereon that when executed by the one or more processors cause a first communication component to:
   receive an information request generated in response to a session initiation protocol (SIP) message originating from a calling device and related to an emergency communication;
   determine a location of the calling device using one of multiple location determination methods supported by the calling device;
   determine a destination emergency response center proximate to the location of the calling device; and
   transmit an identification of the destination emergency response center to a second communication component in response to the information request.

2. The system of claim 1, wherein the second communication component includes an Emergency Call Session Control Function (E-CSCF).

3. The system of claim 1, wherein the first communication component includes a gateway mobile location center (GMLC).

4. The system of claim 1, wherein the second communication component is further configured to:
   generate a modified SIP message containing routing information associated with the destination emergency response center; and
   send the modified SIP message to the destination emergency response center.

5. The system of claim 1, wherein the SIP message originating from the calling device includes a geographic location of the calling device.

6. The system of claim 1, wherein the SIP message originating from the calling device does not include a geographic location of the calling device and the system further comprising a telephony application server (TAS) capable of identifying the geographic location of the calling device.

7. The system of claim 1, wherein the SIP message originating from the calling device does not include a geographic location of the calling device, and wherein the calling device is a fixed device, and wherein the geographic location of the calling device is determined by accessing stored subscriber information specifying the geographic location of the fixed device.

8. The system of claim 1, wherein the emergency communication services include a voice call.

9. The system of claim 1, wherein the emergency communication services include a text-based messaging session.

10. A method for identifying emergency communication services in a wireless network implementing an IP Multimedia Subsystem (IMS) architecture, the method comprising:
    receiving a session initiation protocol (SIP) message originating from a calling device,
       wherein the SIP message includes a request to initiate an emergency communication session;
    determining a location of the calling device using one of multiple location determination methods for the calling device;
    identifying an emergency response center that is located within a coverage area that includes the location of the calling device;
    generating a modified SIP message by modifying the SIP message to include information regarding the identified emergency response center; and
    transmitting the modified SIP message to the emergency response center to initiate the requested emergency communication session between the calling device and the emergency response center.

11. The method of claim 10, wherein the emergency response center is a Public Safety Access Point (PSAP) and wherein generating the modified SIP message also includes:
    extracting the location information from a response message originating from a location server,
        wherein the response message includes a destination PSAP; and
    modifying the received SIP message to include at least a portion of the location information.

12. The method of claim 10, wherein the emergency response center is a Public Safety Access Point (PSAP) and wherein generating the modified SIP message also includes:
    extracting the location information from a response message from a location server,
        wherein the response message includes a destination PSAP; and
    modifying the received SIP message to include at least a portion of the location information,
        wherein the modified SIP message is the response message received from the location server and is sent substantially unchanged.

13. The method of claim 10, wherein generating the modified SIP message is performed by a gateway mobile location center (GMLC).

14. The method of claim 10, wherein the steps are performed on a location server or a communication session control server.

15. The method of claim 10, further comprising:
    evaluating, in response to receiving the SIP message, one or more location techniques based upon the calling device; and
    initiating an identified location technique supported by the calling device to determine a location of the calling device.

16. The method of claim 10, wherein the received SIP message includes a location of the calling device.

17. A system for providing E911 services in a wireless network implementing an IP Multimedia Subsystem (IMS) architecture, the system comprising:
    a first communication component configured to receive a Session Initiation Protocol (SIP) message from a calling device,
        wherein the SIP message includes a request to initiate an emergency communication session;
    a second communication component configured to:
        forward the SIP message to a location server to determine a location of the calling device and to select an emergency response center having a geographical coverage area correlating to the location of the requesting device; and
            wherein the location of the requesting device is determined using one of multiple location determination methods of the calling device; and
        receive a modified SIP message and indication of the emergency response center from the location server, wherein the modified SIP message includes information indicative of the emergency response center; and
    a third communication component configured to send the modified SIP request to the emergency response center.

18. The system of claim 17, wherein the emergency response center includes a Public Safety Access Point (PSAP).

19. The system of claim 17, wherein the location server includes a capabilities component configured to evaluate capabilities of the calling device that identify one or more location techniques supported by the calling device.

20. The system of claim 17, wherein the emergency response center includes a Public Safety Access Point (PSAP) and the location server includes a capabilities component configured to evaluate capabilities of the calling device that identify one or more location techniques supported by the calling device, and
    wherein the device location component is further configured to determine an updated geographical location of the calling device and provide the updated geographical location to the destination PSAP during an emergency communication session between the calling device and the destination PSAP.

* * * * *